United States Patent [19]
Borodin et al.

[11] 3,990,480
[45] Nov. 9, 1976

[54] METHOD AND FABRIC FOR MAKING REINFORCING CAGES

[75] Inventors: Daniel J. Borodin, Detroit; Wilbur E. Tolliver, Holland, both of Mich.

[73] Assignee: New York Wire Mills Corporation, Tonawanda, N.Y.

[22] Filed: Jan. 20, 1975

[21] Appl. No.: 542,410

[52] U.S. Cl. .............................. 138/175; 52/653; 138/178
[51] Int. Cl.² .......................................... F16L 9/04
[58] Field of Search ............ 138/175, 176, 178, 172; 52/653, 664

[56] References Cited
UNITED STATES PATENTS

| | | | |
|---|---|---|---|
| 798,730 | 9/1905 | Johnson | 52/653 |
| 1,090,312 | 3/1914 | Lachman | 52/653 |
| 1,501,850 | 7/1924 | Karstens et al. | 138/175 |
| 3,252,263 | 5/1966 | Korf | 52/664 |
| 3,831,890 | 8/1974 | Tolliver | 138/175 |

Primary Examiner—Richard E. Aegerter
Assistant Examiner—L. Footland
Attorney, Agent, or Firm—Price, Heneveld, Huizenga & Cooper

[57] ABSTRACT

Fabric and method for reinforcing concrete pipe or the like in which a plurality of sets of transverse wires are arranged along the length of the line, or circumferential defining, wires, each set defining a segment of fabric having a length corresponding to the circumference and overlap desired for a cage to be formed from that segment. Preferably, the distance between the first and last transverse wires in each set corresponds to the desired circumference of a cage to be formed and the distance between adjacent sets corresponds to the desired overlap.

4 Claims, 5 Drawing Figures

METHOD AND FABRIC FOR MAKING REINFORCING CAGES

BACKGROUND OF THE INVENTION

The present invention relates to concrete pipe reinforcing fabric and a method for forming concrete pipe reinforcing cages. Pipe reinforcing fabric comprises a network of a plurality of transverse wires and a plurality of line wires. When a cage is formed from the fabric, the transverse wires will correspond to the longitudinal wires in the cage while the line wires will correspond to the circumferential wires in the cage.

Traditionally, one purchases such fabric with the transverse wires arranged at 6, 8 or 12 inch intervals. This fabric can be used in forming cages of many different diameters. In forming a cage, the pipe producer cuts the fabric into the length needed to make a cage of a particular circumference. Length is determined by counting the transverse wires and thereby computing the desired length based on the known spacing between the transverse wires. Once the fabric is cut, it is formed into a circular or elliptical cage and the ends of the fabric are overlapped and secured together, typically by welding.

This procedure has been used in the industry for many years, in spite of the fact that it inherently results in wasted fabric. For example, in constructing a reinforcing cage for 12 inch diameter pipe, a cage is formed which is 14 inches in diameter and approximately 44 inches in circumference. The fabric used in forming such cages typically has transverse wires arranged at 6 inch intervals. In order to provide for the necessary 44 inches, the producer counts out eight transverse strands of wire and cuts the fabric generally adjacent the last strand. This results in fabric which is 48 inches long. Thus, the fabric must be overlapped 4 inches at the end in order to provide the desired 44 inch circumference. Since typically only one inch or so of overlap would be required in order to securely weld the cage, three inches of fabric are actually wasted.

Another difficulty which is encountered in this very popular prior art method is that the overlap must be gauged in order to insure proper circumference in the cage. The operator must take the time and trouble to set a gauge adjacent several circumferential strands as he overlaps and welds them. Thus, one encounters both wasted material and wasted time and energy in connection with the typical prior art method for forming conventionally available fabric.

SUMMARY OF THE INVENTION

In the present invention, fabric is provided which is specifically designed for making cages of only one circumference. The fabric has a plurality of spaced sets of transverse strands in which the distance between the first transverse strands in adjacent sets is equal to a predetermined distance corresponding to the desired circumference of a cage to be formed from the fabric plus the length of overlap desired to insure proper securement of the ends of the fabric which are brought together to form the cage. Preferably, the distance between the first transverse strand and the last transverse strand of each set corresponds to the desired circumference for the cage and the distance between adjacent sets corresponds to the desired length of overlap.

This fabric is formed by cutting between sets and joining the ends of the cut fabric together to define a cage. When the preferred form of the fabric is employed, the first and last transverse wires of the set are abutted together, thereby providing an automatic gauge for insuring both the proper circumference of the cage and the proper overlap. In this way, both wasted fabric and wasted gauging time and energy are eliminated.

These and other objects and advantages of the invention will be more fully understood and appreciated by reference to the written specification and appended drawings.

PREFERRED EMBODIMENT

Figure 1:
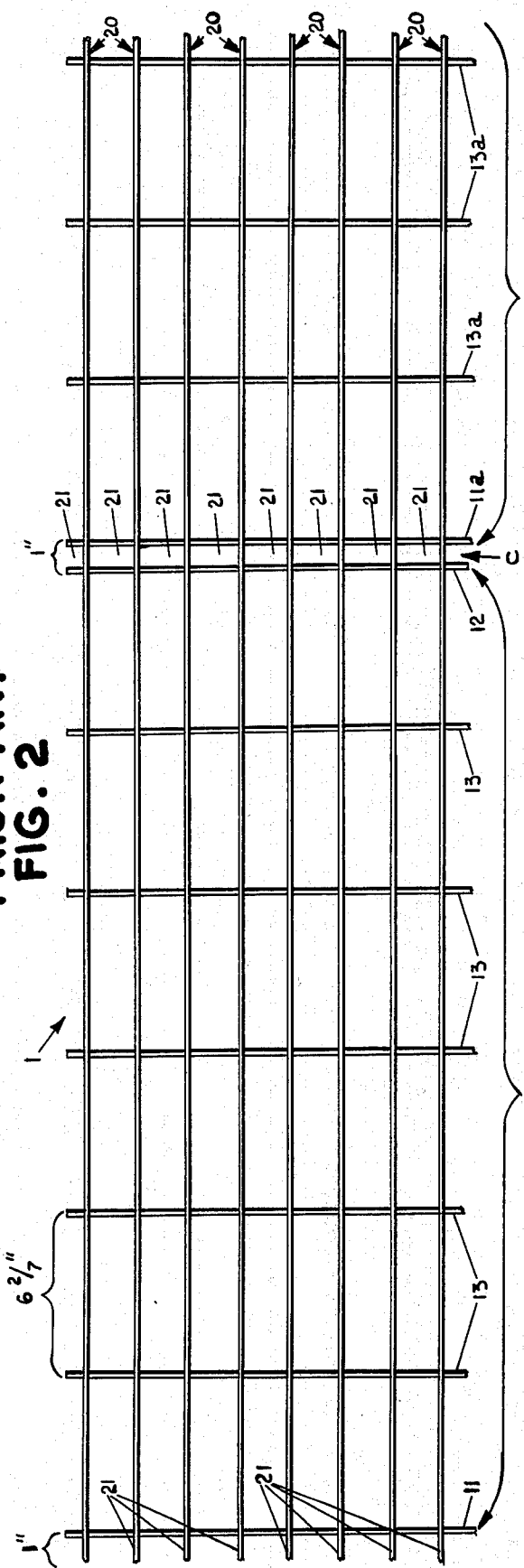
FIG. 1 is a plan view of a section of fabric made in accordance with the present invention.

In the preferred embodiment, the fabric 1 comprises a plurality of sets 10 and 10a of transverse wires arranged on a plurality of line or circumferential defining wires 20 (FIG. 1). The transverse wires are welded to the line wires 20 in a conventional manner. Each set 10 of transverse wires includes a first transverse wire 11, a last transverse wire 12 and a plurality of intermediate transverse wires 13. In FIG. 1, a second set of transverse wires is numbered 10a in order to distinguish it from the set 10 and its first wire is referenced by the numeral 11a with its intermediate transverse wires being referenced with the numeral 13a. For convenience, the entire set 10a is not shown.

Unlike prior art fabric, the fabric 1 of this invention is manufactured specifically for use in producing a cage of a particular circumference. Thus, the circumference for the cage is first determined and the first transverse strand 11 and the last transverse strand 12 are positioned along the line wires 20 at an interval equal to the predetermined desired cage circumference. The intermediate strands 13 are arranged at equally spaced intervals between the first and last strands 11 and 12. The first strand 11a of a succeeding adjacent set 10a is spaced a distance from the last strand 12 of the preceding set 10 which is equal to the desired overlap for the cage to be formed. The fabric shown in FIG. 1 is intended for manufacturing 14 inch diameter cages having a circumference of approximately 44 inches. The distance between first strand 11 and last strand 12 in each set 10 is 44 inches. The intermediate strands 13 are spaced at equal intervals therebetween. Since it is desirable to maintain approximately the same number of transverse wires in the ultimate cage as would be obtained using conventional fabric, the spacing between adjacent transverse wires in each set is maintained at approximately 6 inches. In the case of the fabric of FIG. 1, the distance between intermediate strands 13, and the distance between first strand 11 and its next adjacent intermediate strand 13, and last strand 12 and its adjacent intermediate strand 13, is approximately 6 and 2/7 inches. Since the ends of a segment of fabric are typically secured together by welding an overhanging portion of the circumferential defining strands 20 upon their opposite ends, a one inch space is provided between the last wire 12 of set 10 and the first wire 11a of set 10a to provide a one inch overhang of wire for overlapping and welding purposes. When the fabric 1 is cut adjacent arrow "C", the segment of fabric defined by set 10a will have a plurality of overhanging wire portions 21 which project beyond first strand 11a. Such overhanging portions 21 are also shown projecting from strand 11.

Figure 2:
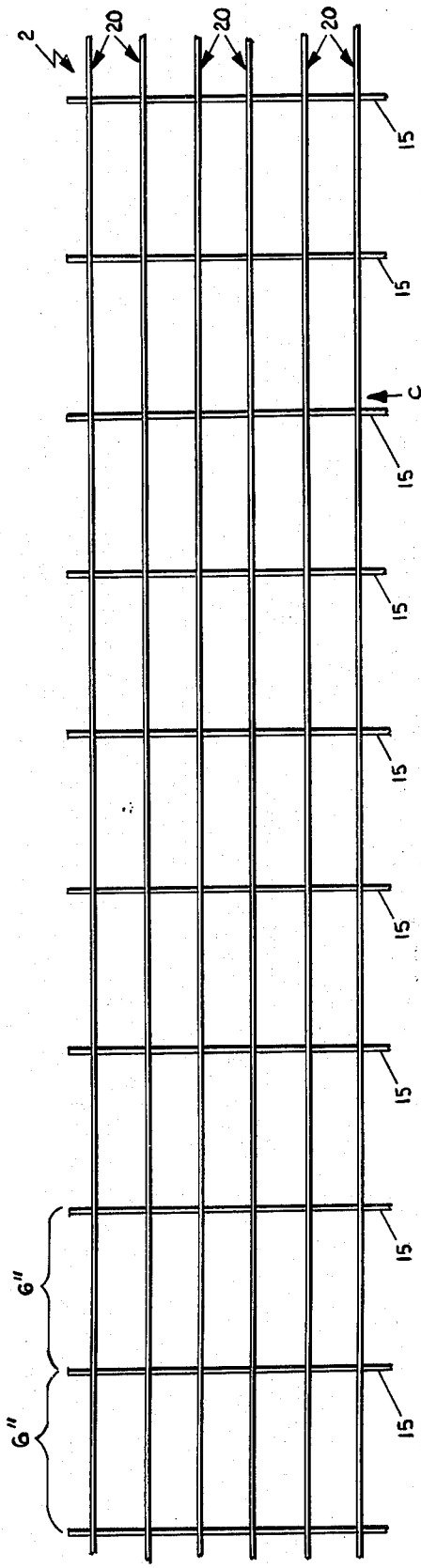
FIG. 2 is a plan view of a corresponding section of prior art fabric.
Figure 5:
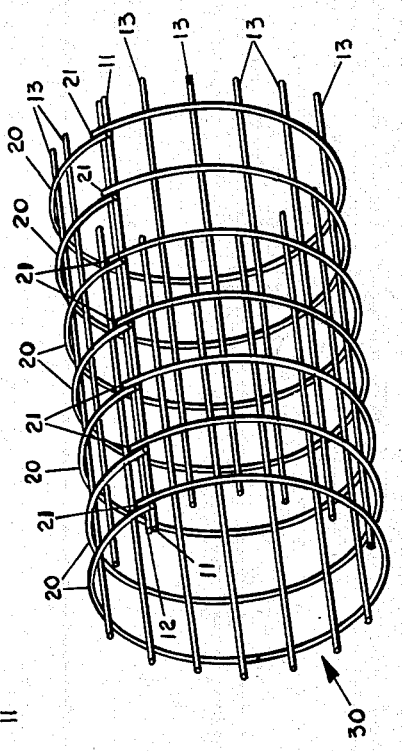
FIG. 5 is a perspective view of a cage formed from the fabric shown in FIG. 1.

To form a cage 30 as shown in FIG. 5, the fabric of FIG. 1 is cut at a point closely adjacent the last strand 12 of set 10. This point is indicated on FIG. 1 by an arrow labeled C. The shear operator easily locates, without counting wires, the point to be cut. The one inch spacing between sets is readily noticeable. The ends of the segment so cut are brought together until the first strand 11 of the set abuts against the last strand 12 of the set and the overhanging portions 21 are lapped against the opposite ends of the cut circumferential defining strands 20 and are welded thereto. The result is a cage which is quickly and efficiently formed with a minimum of waste. In contrast, the prior art fabric 2 which is shown in FIG. 2 would be formed by counting out eight transverse strands 15, cutting adjacent the last transverse strand 15 at the point indicated by the arrow C in FIG. 2, and forming by bringing the ends of the cut segment together. At that point, the operator would have to carefully gauge the six inch overhang at the end of the segment so that only four inches of it would overlap. Since only one inch of overlap is required for good welding purposes, three inches of fabric would in effect be wasted and the time required to properly gauge the overlap would be completely wasted.

Many variations of the specific fabric shown in FIG. 1 are possible within the scope of this invention. Thus, one might form the cage 5 by securing the first strand 11 and the last strand 12 directly together, as for example by welding or the like. In this case, no overlapping or overhanging portions 21 would be required. Thus, one would form the fabric 1 by placing the end strand 12 of one set as closely as possible to the first strand 11a of the next succeeding set 10a, leaving just enough room to allow the fabric to be cut at that point. The resulting cut segment would have no overhang and the resulting formed cage would have no overlapping circumferential wires.

Figure 3:
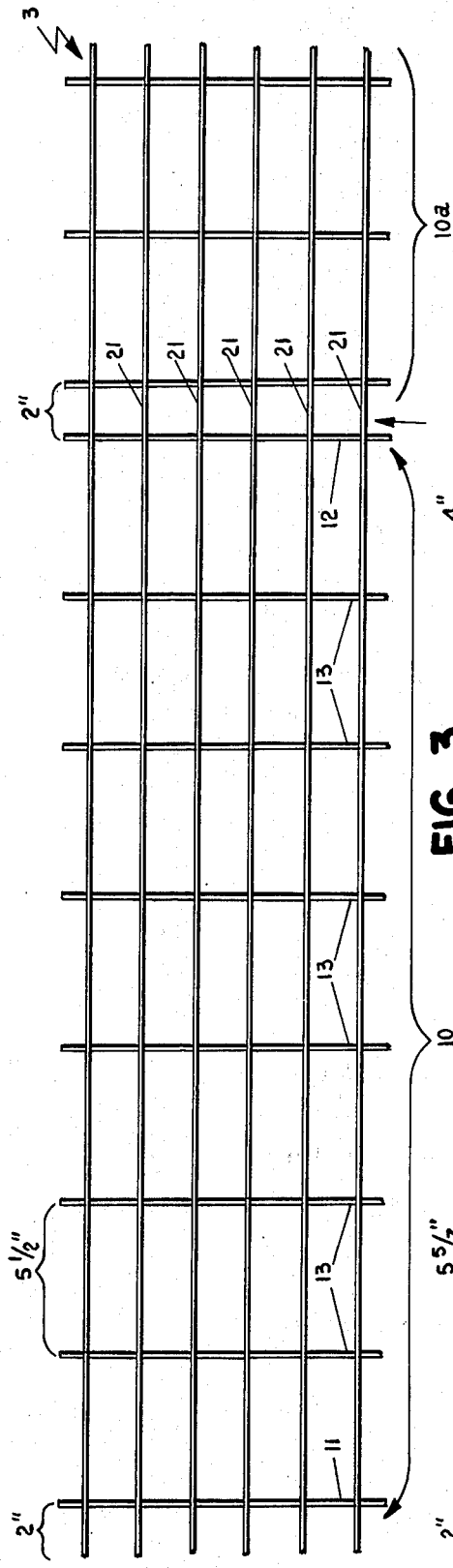
FIG. 3 is a plan view of a section of an alternative embodiment fabric made in accordance with the present invention.

In a similar vein, a manufacturer might actually desire a greater overlap than one inch. In the fabric shown in FIG. 3, the distance between one set 10 and an adjacent set 10a is two inches, thereby providing a two inch overhang 21 and a two inch overlap when a cage is formed by abutting the first transverse strand 11 to the last transverse strand 12. In this particular fabric, the manufacturer also desired to have a larger number of transverse strands in each cage. Thus, there are nine transverse strands, including the first and last strands 11 and 12 and their intermediate strands 13, in each set 10, with the spacing between adjacent transverse strands being 5½ inches.

Figure 4:
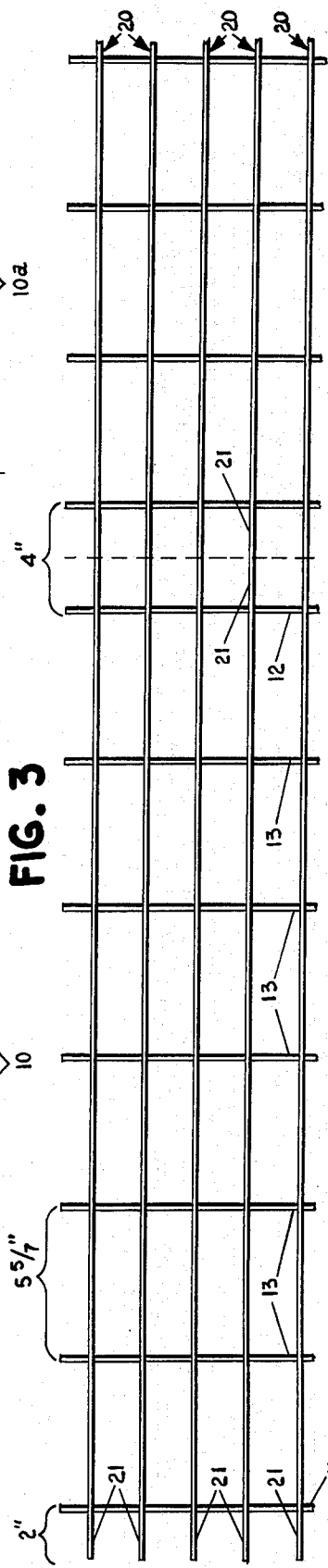
FIG. 4 is a plan view of a section of yet another alternative embodiment fabric made in accordance with the present invention.

The alternative embodiment fabric 4 shown in FIG. 4 is especially designed for making 44 inch cages with zero overlap. However, the ends of each segment are intended to be secured together by but welding the ends of each of the circumferential defining strands 20 in a cut segment. To achieve this result, eight transverse strands, including the first strand 11 and the last strand 12, are arranged in each set 10 at intervals of 5 and 5/7 of an inch. The fabric is then cut into segments at the point C which is halfway between adjacent sets 10 and 10a. The distance between adjacent sets is four inches. There will be an overhang 21 at each end of the cut segment. The ends of these overhanging portions 21 are then butt welded together. The segments were cut at a point halfway between adjacent sets in order to provide two inches at either end of the cut segment to grip onto during the butt welding process. The result is a cage having a 44 inch circumference and eight transverse wires.

Of course it will be understood that various other modifications, changes and alterations can be made without departing from the spirit and broader aspects of the invention as more particularly defined by the attached claims.

The embodiments of the invention in which an exclusive property or privilege is claimed are defined as follows:

1. A method for forming concrete pipe reinforcing cages or the like comprising: arranging a plurality of transverse strands in sets on a plurality of circumferential defining strands; positioning the first strand in each of said sets of transverse strands a distance from the first strand in the next adjacent set of transverse strands a distance corresponding to a predetermined circumference for the cage to be formed from the fabric and to a predetermined overlap for the ends of the circumferential strands of the cage to be formed from the fabric; securing said transverse strands to said circumferential defining strands to thereby create a reinforcing fabric; cutting said fabric between the last strand of one set and the first strand of a next adjacent set to form a segment of fabric from which a cage can be formed; forming a cage from said fabric segment by securing the ends of said segment with the predetermined desired overlap at the ends of the circumferential defining strands of the segment.

2. The method of claim 1 in which the last transverse strand in each set is positioned a distance from the first transverse strand in each set which corresponds to the predetermined circumference of the cage to be formed, thereby creating a distance between the last strand of each set and the first strand of a next adjacent set which corresponds to the said predetermined desired overlap.

3. The method of claim 2 comprising: cutting said fabric adjacent the last strand in succeeding ones of said sets to thereby create said segments of fabric to form a cage; forming each said segment by bringing the ends of said segment together until said first strand of said set abuts said last strand of said set and then performing said step of securing said ends of said segment together.

4. A method for providing lengths of wiring reinforcing fabric for a predetermined purpose comprising: arranging a plurality of transverse strands in sets on a plurality of line strands oriented at generally right angles to said transverse strands; spacing the first transverse strand in each of said sets at a distance from the last transverse strand in each of said sets which is equal to a predetermined length required for a particular predetermined purpose; generally arranging said transverse strands within each of said sets at regular intervals; and spacing the last strand in each of said sets at a distance from the first strand in the next adjacent set which is sufficiently great to allow said fabric to be cut between said sets and which is less than said regular interval between said transverse strand within each of said sets whereby the point at which said fabric is to be cut is readily apparent.

* * * * *